United States Patent [19]

Satake et al.

[11] Patent Number: 4,895,925

[45] Date of Patent: Jan. 23, 1990

[54] MELT-STABLE POLY(ARYLENE THIOETHER-KETONE) AND PRODUCTION PROCESS THEREOF

[75] Inventors: Yoshikatsu Satake; Takashi Kaneko; Yutaka Kobayashi; Yo Iizuka; Takayuki Katto; Zenya Shiiki, all of Iwaki, Japan

[73] Assignee: Kureha Kagaku Kogyo K.K., Tokyo, Japan

[21] Appl. No.: 194,012

[22] Filed: May 12, 1988

[30] Foreign Application Priority Data

May 15, 1987 [JP] Japan .................. 62-118619
May 7, 1988 [JP] Japan .................. 63-109916

[51] Int. Cl.$^4$ ............................. C08G 2/00
[52] U.S. Cl. .................... 528/226; 528/222
[58] Field of Search ................ 528/222, 226

[56] References Cited

U.S. PATENT DOCUMENTS

| | | | |
|---|---|---|---|
| 4,590,104 | 5/1986 | Ziener et al. | 427/389.9 |
| 4,690,972 | 9/1987 | Johnson et al. | 525/471 |
| 4,698,415 | 10/1987 | Sinclair et al. | 528/226 |
| 4,716,212 | 12/1987 | Gaughan | 528/226 |
| 4,745,167 | 5/1988 | Iizuka et al. | 526/262 |

FOREIGN PATENT DOCUMENTS

| | | |
|---|---|---|
| 270955 | 6/1988 | European Pat. Off. |
| 274754 | 7/1988 | European Pat. Off. |
| 280325 | 8/1988 | European Pat. Off. |
| 3405523 | 8/1985 | Fed. Rep. of Germany |
| 13347 | 7/1972 | Japan |
| 58435 | 4/1985 | Japan |
| 104126 | 6/1985 | Japan |
| 221229 | of 1986 | Japan |

OTHER PUBLICATIONS

Indian J. Chem., vol. 21A, May 1982, pp. 501–502.
*Indian Journal of Pure and Applied Physics*, vol. 22, Apr. 1984, pp. 247–248.
*Mol. Cryst. Liq. Cryst.*, vol. 83, 1982, pp. 229–238.

*Primary Examiner*—Morton Foelak
*Attorney, Agent, or Firm*—Lowe, Price, LeBlanc, Becker & Shur

[57] ABSTRACT

Disclosed herein are a melt-stable poly(arylene thioether-ketone) having predominant recurring units of the formula

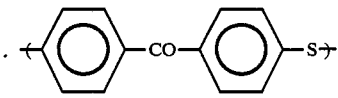

and having a melting point, Tm of 310°–380° C., a residual melt crystallization enthalpy, ΔHmc (420° C./10 min) of at least 10 J/g, a melt crystallization temperature, Tmc (420° C./10 min) of at least 210° C., and a reduced viscosity of 0.2–2 dl/g as measured at 25° C. and a polymer concentration of 0.5 g/dl in 98 wt. % sulfuric acid as well as a production process of the poly(arylene thioether-ketone). The poly(arylene thioether-ketone) has melt stability so that conventional melt processing techniques can be applied easily. The poly(arylene thioether-ketone) is a highly-crystalline polymer whose density is at least 1.34 g/cm$^3$ when annealed at 280° C. for 30 minutes.

4 Claims, No Drawings

MELT-STABLE POLY(ARYLENE THIOETHER-KETONE) AND PRODUCTION PROCESS THEREOF

FIELD OF THE INVENTION

This invention relates to poly(arylene thioether-ketone) (hereinafter abbreviated as "PTK") having predominant recurring units of the formula

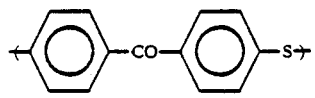

and a production process thereof, and specifically to a melt-stable PTK permitting easy application of conventional melt processing techniques and a process for the production thereof.

BACKGROUND OF THE INVENTION

With the advance of weight-, thickness- and length-reducing technology in the field of the electronic and electric industry and with the recent advancement of weight-reducing technology in the fields of the automobile, aircraft and space industries, there has been a strong demand for crystalline thermoplastic resins having heat resistance of about 300° C. or higher and permitting easy melt processing in recent years.

As crystalline, heat-resistant, thermoplastic resins developed to date, there are, for example, poly(butylene terephthalate), polyacetal, poly(p-phenylene thioether) (PPS), etc. These resins are however unable to meet the recent requirement level for heat resistance.

Polyether ether ketones (PEEKs) and polyether ketones (PEKs) have recently been developed as heat-resistant resins having a melting point of about 300° C. or higher. These resins are crystalline thermoplastic resins. It has therefore been known that conventional melt processing techniques such as extrusion, injection molding and melt spinning can be applied to easily form them into various molded or formed articles such as extruded products, injection-molded products, fibers and films. These resins however use expensive fluorine-substituted aromatic compounds such as 4,4'-difluorobenzophenone as their raw materials. Limitations are thus said to exist to the reduction of their costs. It is also pointed out that these resins involve a problem in expanding their consumption.

Based on an assumption that PTKs could be promising candidates for heat-resistant thermoplastic resins like PEEKs and PEKs owing to their similarity in chemical structure, PTKs have been studied to some extent to date. There are some disclosure on PTKs, for example, in Japanese Patent Laid-Open No. 58435/1985 (hereinafter referred to as "Publication A"), German Offenlegungsschrift 34 05 523A1 (hereinafter referred to as "Publication B"), Japanese Patent Laid-Open No. 104126/1985 (hereinafter referred to as "Publication C"), Japanese Patent Laid-Open No. 13347/1972 (hereinafter referred to as "Publication D"), Indian J. Chem., 21A, 501–502 (May, 1982) (hereinafter referred to as "Publication E"), and Japanese Patent Laid-Open No. 221229/1986 (hereinafter referred to as "Publication F").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

It was attempted to produce some molded or formed products in Publications A and B. Since the PTKs had poor melt-stability, certain specified types of molded or formed products were only obtained by a special molding or forming process, where PTKs were used only as a sort of binder, being impregnated into a great deal of reinforcing fibers of main structural materials and molded or formed under pressure Since the conventional PTKs are all insufficient in melt stability as described above, it has been unable to obtain molded or formed products from them by applying conventional melt processing techniques.

OBJECTS AND SUMMARY OF THE INVENTION

An object of this invention is to overcome the above-mentioned drawbacks of the conventional PTKs and hence to provide novel melt-stable PTKs which permit easy application of conventional melt processing techniques.

Another object of this invention is to provide a process for economically producing melt-stable PTKs from raw materials whose prices are relatively low.

First of all, the present inventors have chosen economical dichlorobenzophenone and dibromobenzophenone as raw materials instead of employing expensive fluorine-substituted aromatic compounds. In addition, a polymerization process was designed in an attempt to conduct polymerization by increasing water content in the polymerization system to an extremely high level compared to processes reported previously, adding a polymerization aid and suitably controlling the profile of the polymerization temperature. As a result, it was found that a high molecular-weight PTK would be obtained economically. The high molecular-weight PTK obtained by the above new process was however still dissatisfactory in melt stability. As a next step, the present inventors made further improvements to the polymerization process. It has then been revealed that PTKs, which have been improved significantly in melt stability compared to the conventional PTKs and hence permit the application of conventional melt processing techniques, can be obtained by conducting polymerization in a system free of any polymerization aid while paying attention to the selection of a charge ratio of monomers, the shortening of the polymerization time at high temperatures, the selection of a material for a polymerization reactor and optionally, by applying a stabilization treatment in a final stage of the polymerization. It has also been found that molded and formed products such as extrusion products, injection-molded products, fibers and films can be obtained easily from such melt-stable PTKs by conventional melt processing techniques.

The present invention has been brought to completion on the basis of these findings In one aspect of this invention, there is thus provided a melt-stable poly(arylene thioether-ketone) having predominant recurring units of the formula

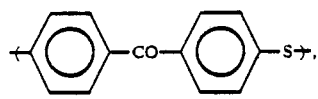

wherein the —CO— and —S— are in the para position to each other, and having the following physical properties (a)–(c):

(a) melting point, Tm being 310°–380° C.;
(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter (hereinafter abbreviated as "DSC") at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and
(c) reduced viscosity being 0.2–2 dl/g as determined by viscosity measurement at 25° C. and a polymer concentration of 0.5 g/dl in 98 percent by weight sulfuric acid.

In another aspect of this invention, there is also provided a process for the production of a melt-stable poly(arylene thioether-ketone), which comprises polymerizing an alkali metal sulfide and a dihalogenated aromatic compound consisting principally of 4-dichlorobenzophenone and/or 4,4'-dibromobenzophenone by dehalogenation and sulfuration reaction in an organic amide solvent, under the following conditions (a)–(c):

(a) ratio of the water content to the amount of the charged organic amide solvent being 2.5–15 (mole/kg);
(b) ratio of the amount of the charged dihalogenated aromatic compound to the amount of the charge alkali metal sulfide being 0.95–1.2 (mole/mole); and
(c) reaction temperature being 60° C.–300° C. with a proviso that the reaction time at 210° C. and higher is within 10 hours, said poly(arylene thioether-ketone) having predominant recurring units of the formula

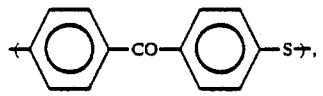

wherein the —CO— and —S— are in the para position to each other, and having a residual melt crystallization enthalpy, ΔHmc (420° C./10 min) being at least 10 J/g and a melt crystallization temperature, Tmc (420° C./10 min) being at least 210° C., wherein said ΔHmc (420° C./10 min) and Tmc (420° C./10 min) are determined by a DSC at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.

According to the present invention, it is therefore possible to obtain high molecular-weight PTKs having melt stability sufficient to apply conventional melt processing techniques. The PTKs of this invention are crystalline and have a density as high as at least 1.34 g/cm³ when annealed at 280° C. for 30 minutes. Various heat-resistant molded and formed products having practical properties, such as extrusion products, injection-molded products, fibers and films, can be obtained economically by using the PTKs of this invention.

DETAILED DESCRIPTION OF THE INVENTION

Features of the present invention will hereinafter be described in detail.

Chemical Structure of PTKs

The melt-stable PTKs according to the present invention are poly(arylene thioether-ketones) (PTKs) having dominant recurring units of the formula

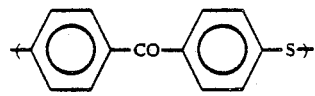

wherein the —CO— and —S— are in the para position to each other. In order to be heat-resistant polymers comparable with PEEKs and PEKs, the PTKs of this invention may preferably contain, as a main constituent, the above recurring units in a proportion greater than 50 wt. %, more preferably, of 60 wt. % or higher, most preferably, of 70 wt. % or higher. If the proportion of the recurring units is 50 wt. % or less, there is a potential problem that the crystallinity of the polymer is reduced and its heat resistance is reduced correspondingly.

Exemplary recurring units other than the above recurring units may include:

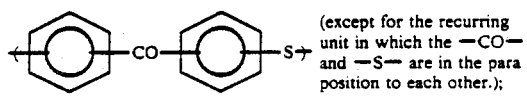 (except for the recurring unit in which the —CO— and —S— are in the para position to each other.);

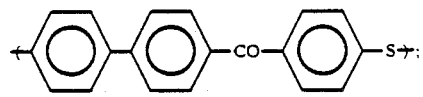

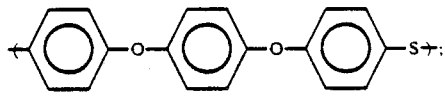

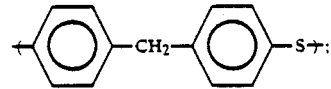

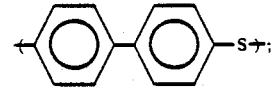

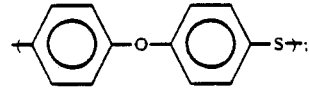

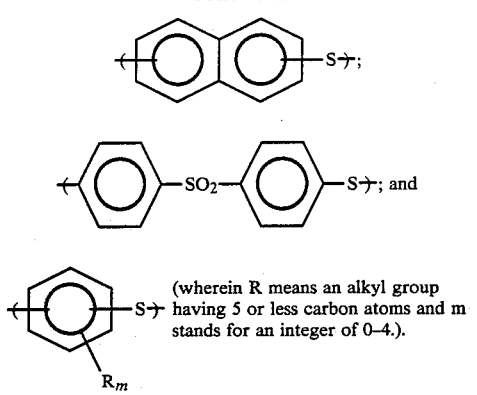

(wherein R means an alkyl group having 5 or less carbon atoms and m stands for an integer of 0–4.).

It is desirable that the melt-stable PTKs of this invention are uncured polymers, especially, uncured linear polymers. The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like In general, "curing" causes a PTK to lose or decrease its melt stability and crystallinity. Curing therefore makes it difficult to employ conventional melt processing of a PTK. Even if a molded or formed product is obtained, the product tends to have a low density and reduced crystallinity, in other words, may not be regarded as "a heat-resistant, mold or formed product" substantially. Curing is hence not preferred.

However, PTKs having a partially crosslinked and-/or branched structure to such an extent still allowing the application of conventional melt processing techniques are still embraced in the present invention. For example, PTKs obtained by conducting polymerization in the presence of a small amount of a crosslinking agent (e.g., polychlorobenzophenone, polybromobenzophenone or the like) and PTKs subjected to mild curing can be regarded as melt-stable PTKs of this invention.

Physical Properties of PTKs

Summary of the physical properties:

The melt-stable PTKs of this invention have the following physical properties.

(a) As indices of the characteristics of heat-resistant polymers, their melting points, Tm range from 310° to 380° C.

(b) As indices of the melt stability of polymers to which conventional melt processing techniques can be applied, their residual melt crystallization enthalpies, $\Delta$Hmc (420° C./10 min) are at least 10 J/g, and their melt crystallization temperatures, Tmc (420° C./10 min) are at least 210° C.

(c) In the case of extrusion products, fibers, films and the like, their shaping is difficult due to drawdown or the like upon melt forming unless the molecular weight is sufficiently high. They should have a high molecular weight. As indices of the molecular weights of the polymers, their reduced viscosities, $\eta_{red}$ should be within the range of 0.2–2 dl/g. In the present invention, each reduced viscosity, $\eta_{red}$ is expressed by a value as determined by viscosity measurement at 25° C. and a polymer concentration of 0.5 g/dl in 98 wt. % sulfuric acid.

(d) As indices of the characteristics of highly-crystalline polymers, the densities of the polymers obtained in a crystallized form by annealing them at 280° C. for 30 minutes are at least 1.34 g/cm$^3$ at 25° C.

Details of the physical properties:

(1) Heat resistance:

The melting point, Tm of a polymer serves as an index of the heat resistance of the polymer.

The PTKs of the present invention have a melting point, Tm of 310° C.–380° C., preferably 320° C.–375° C., more preferably 330° C.–370° C. Those having a melting point, Tm lower than 310° C. are insufficient in heat resistance as heat-resistant resins comparable with PEEKs and PEKs. On the other hand, it is difficult to perform the melt processing of those having a melting point, Tm higher than 380° C. without decomposition. Such an excessively low or high melting point is undesired.

(2) Melt stability:

The greatest feature of the PTKs according to this invention resides in that they have melt stability sufficient to permit the application of conventional melt processing techniques.

All the conventional PTKs have low melt stability and tend to lose their crystallinity or to undergo crosslinking or carbonization, resulting in a rapid increase in melt viscosity, upon their melt processing.

It is hence possible to obtain an index of the melt processability of a PTK by investigating the residual crystallinity of the PTK after holding it at an elevated temperature of its melt processing temperature or higher for a predetermined period of time. The residual crystallinity can be evaluated quantitatively in terms of melt crystallization enthalpy. Specifically, the residual melt crystallization enthalpy, $\Delta$Hmc (420° C./10 min) and its melt crystallization temperature, Tmc (420° C./10 min) of the PTK which are determined by a DSC at a cooling rate of 10° C./min after the PTK is held at 50° C. for 5 minutes in an inert gas atmosphere, heated to 420° C. at a rate of 75° C./min and then held for 10 minutes at 420° C., can be used as measures of its melt stability. In the case of a PTK having poor melt stability, it undergoes crosslinking or the like at the above high temperature condition of 420° C. and loses its crystallinity substantially.

The melt-stable PTKs of this invention are polymers whose residual melt crystallization enthalpies, $\Delta$Hmc (420° C./10 min) are preferably at least 10 J/g, more preferably at least 15 J/g, most preferably at least 20 J/g and whose melt crystallization temperatures, Tmc (420° C./10 min) are preferably at least 210° C., more preferably at least 220° C., most preferably at least 230° C.

A PTK, whose $\Delta$Hmc (420° C./10 min) is smaller than 10 J/g or whose Tmc (420° C./10 min) is lower than 210° C., tends to lose its crystallinity or to induce a melt viscosity increase upon its melt processing, so that difficulties are encountered upon application of conventional melt processing techniques.

(3) Molecular weight:

The solution viscosity, for example, reduced viscosity, $\eta_{red}$ of a polymer can be used as an index of its molecular weight.

When a PTK is subjected to extrusion or melt spinning by way of example, drawdown or the like may occur as a problem upon its melt processing.

Therefore, the molecular weight which is correlated directly to the melt viscosity of the PTK is also an important factor for its melt processability.

In order to apply conventional melt processing techniques, high molecular-weight PTKs whose reduced viscosities, $\eta_{red}$ are preferably 0.2–2 dl/g, more preferably, 0.3–2 dl/g, most preferably 0.5–2 dl/g are desired. Since a PTK whose $\eta_{red}$ is lower than 0.2 dl/g has a low melt viscosity and high tendency of drawdown, it is difficult to apply conventional melt processing techniques. Further, molded or formed products obtained from such a PTK are insufficient in mechanical properties. On the other hand, a PTK whose $\eta_{red}$ exceeds 2 dl/g is very difficult in production and processing.

(4) Crystallinity:

As an index of the crystallinity of a polymer, its density is used.

The PTKs of this invention are desirably polymers whose densities (at 25° C.) are preferably at least 1.34 g/cm³, more preferably at least 1.35 g/cm³ when measured in a crystallized form by annealing them at 280° C. for 30 minutes. Those having a density lower than 1.34 g/cm³ have potential problems that they may have low crystallinity and hence insufficient heat resistance and their processability such as injection-moldability and mechanical properties of resulting molded or formed products may also be insufficient.

In particular, PTKs crosslinked to a high degree (e.g., the PTKs described in Publication A) have been reduced in crystallinity and their densities are generally far lower than 1.34 g/cm³.

Production Process of PTKs

The melt-stable PTKs of this invention can each be produced, for example, by subjecting an alkali metal sulfide and a dihalogenated aromatic compound consisting principally of dichlorobenzophenone and/or dibromobenzophenone to a dehalogenation and sulfuration reaction under specific conditions in an organic amide solvent.

Raw materials:

In the process for the production of a PTK of this invention, employed as principal raw materials are an alkali metal sulfide and a dihalogenated aromatic compound as monomers and an organic amide solvent as a polymerization medium.

(1) Alkali metal sulfide:

Illustrative examples of the alkali metal sulfide useful in the practice of this invention include lithium sulfide, sodium sulfide, potassium sulfide, rubidium sulfide, cesium sulfide and mixtures thereof. These alkali metal sulfides may be used as a hydrate or aqueous mixture or in an anhydrous form. Especially, alkali metal sulfides in the form of a hydrate or aqueous mixture having a water content within the range specified in the present invention are advantageous in that a dehydration step, i.e., distillation of water prior to the polymerization step can be omitted. Among these alkali metal sulfides, sodium sulfide is most economical and is hence preferred industrially.

A small amount of an alkali metal alcoholate, alkali metal hydroxide or the like may also be added in order to render harmless an alkali metal polysulfide, alkali metal thiosulfate or the like which may be contained at a trace level in such an alkali metal sulfide.

From the viewpoint of an industrial raw material containing minimized impurities, crystalline sodium sulfide pentahydrate is the best among alkali metal sulfides available commercially on the market.

(2) Dihalogenated aromatic compound:

The dihalogenated aromatic compound employed in the present invention is 4,4'-dichlorobenzophenone and-/or 4,4'-dibromobenzophenone or contains at least one of them as a principal component. It is desirable that 4,4'-dichlorobenzophenone and/or 4,4'-dibromobenzophenone is contained in a proportion sufficient to contain more than 50 wt. %, more preferably 60 wt. % or higher, most preferably 70 wt. % or higher of recurring units of the formula

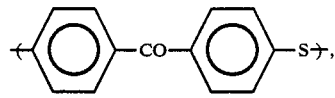

wherein the —CO— and —S— are in the para position to each other, in a polymer to be obtained. If 4,4'-dichlorobenzophenone and/or 4,4'-dibromobenzophenone is contained in such a proportion that the content of the recurring units would be less than 50 wt. % in a polymer to be obtained, it is difficult to obtain any heat-resistant PTK which is the target of the present invention and which is comparable with PEEKs, PEKs and the like.

When it is desired to obtain a PTK in the form of a copolymer, one or more dihalogenated aromatic compounds of a different kind may be used in combination so long as the content of the recurring units is within the above-specified range in the polymer.

As such compounds, may be mentioned, for example, dihalobenzenes, dihaloalkylbenzenes, dihalodiphenyls, dihalodiphenyl ethers, dihalodiphenyl sulfones, dihalonaphthalenes, bis(halogenated phenyl)methane, dihalothiophenes and the like, and mixtures thereof. As substituent halogen atoms, chlorine or bromine atoms may be used preferably from the economical viewpoint. Within a range not giving too much effects to the cost, a small amount of a fluorine compound, for example, difluorobenzophenone may also be used in combination. It is also permissible to produce a PTK, which has a partially crosslinked and/or branched structure, by causing a trihalogenated or higher polyhalogenated compound to exist in a reaction system in such a small amount that the processability and physical properties of the PTK may not be deteriorated to any substantial extent. As illustrative examples of the trihalogenated or higher polyhalogenated compound usable for the above purpose, may be mentioned trichlorobenzophenone, tribromobenzophenone, tetrachlorobenzophenone, tetrabromobenzophenone and the like, and mixtures thereof.

In order to obtain a PTK with a branched or crosslinked structure introduced therein, it is preferable to have a polyhalogenated compound, especially, a polyhalobenzophenone having at least three halogen atoms exist as a crosslinking agent in the polymerization reaction system in such an amount that the charge ratio of the monomeric dihalogenated aromatic compound to the polyhalobenzophenone ranges from 100/0 to 95/5 (mole/mole). If the charged amount of the polyhalobenzophenone is too much, physical properties of the resulting PTK, such as its melt processability, density and crystallinity, will be reduced. It is hence not preferable to charge such a polyhalobenzophenone too much.

(3) Organic amide solvent:

As polymerization media useful for the production process of the PTKs according to this invention, aprotic polar organic solvents having excellent heat stability and alkali resistance may be used. Of these, organic amide solvents (including carbamic amides) are preferred. As such organic amide solvents, may be mentioned N-methylpyrrolidone (NMP), N-ethylpyrrolidone, hexamethylphosphoric triamide, tetramethylurea, dimethylimidazolidinone, dimethylacetamide, etc.

They may also be used as a mixed solvent. Among these organic amide solvents, NMP or its mixed solvent is particularly preferred from the viewpoints of the readiness in obtaining a melt-stable PTK, thermal and chemical stability, economy, etc.

(4) Other raw materials:

Organic caboxylates, fluorides, sulfites and the like of alkali metals or alkaline earth metals, which have conventionally been used as polymerization aids for high molecular-weight poly(p-phenylene thioethers) (PPS), are not preferred in general for the production of the melt-stable PTKs of the present invention.

However, the essential features of the process of this invention for the production of PTKs are not altered so long as one or more of such polymerization aids are added to the polymerization reaction system within a range not deteriorating the melt stability of the PTKs to a substantial extent.

Polymerization process and polymerization conditions:

The polymerization process of this invention basically comprises providing a reactor to be described subsequently, charging an organic amide solvent and an alkali metal sulfide, adjusting the water content, for example, by removing or adding water optionally, charging a dihalogenated aromatic compound, heating the reaction mixture at a high temperature and maintaining it at the high temperature so as to induce a dehalogenation and sulfuration reaction, and optionally charging a specific halogen-substituted aromatic compound further in a final stage of the polymerization so as to cause the halogen-substituted aromatic compound to react. The above polymerization process of this invention may be modified so long as its essential features are not altered.

It is principal features of the polymerization conditions for obtaining the melt-stable PTKs of this invention that the water content in the reaction system is increased significantly, the ratio of the amount of the charged dihalogenated aromatic compound to the amount of the charged alkali metal sulfide is controlled suitably, and the polymerization temperature is controlled suitably and the polymerization at elevated temperatures is limited to a short period of time.

(1) Water content:

In the process of this invention for the production of the melt-stable PTK, the water content in the polymerization reaction system may desirably be within a range of 2.5–15 moles, preferably, 3.5–10 moles per kg of the amount of the charged organic amide solvent.

If the water content is lower than 2.5 moles, a PTK having melt stability can hardly be obtained and decomposition reactions tend to occur in the polymerization reaction. If the water content exceeds 15 moles on the other hand, the reaction rate is reduced and a PTK having a low polymerization degree is only available. One of reasons for the failure to obtain a melt-stable PTK by the conventional processes is believed to reside in an unduly small water content.

In order to adjust the water content in a reaction system, the water content may be reduced by distillation or the like or may be increased by adding water prior to the initiation of a polymerization reaction.

(2) Composition of monomers charged:

The molar ratio of the amount of the charged dihalogenated aromatic compound to the amount of the charged alkali metal sulfide is of primary importance with respect to the composition of charges to be polymerized in accordance with the process of this invention for the production of a melt-stable PTK.

Desirably, the amount of the charged dihalogenated aromatic compound may be within a range of 0.95–1.2 moles, more preferably 1.00–1.10 moles, most preferably 1.005–1.05 moles per mole of the amount of the charged alkali metal sulfide. If the amount of charged dihalogenated aromatic compound is less than 0.95 mole, a melt-stable PTK can hardly be obtained and decomposition reactions tend to occur in the polymerization reaction. On the other hand, any amount of the charged dihalogenated aromatic compound in excess of 1.2 moles can provide a low molecular-weight PTK only and are not preferred.

Regarding the ratio of the amount of the charged organic amide solvent to the amount of the charged alkali metal sulfide in the composition of charges to be polymerized, it is desirable to charge the organic amide solvent in an amount of 0.3–5 kg, more preferably, 0.5–3 kg per mole of the amount of the charged alkali metal sulfide. If the amount of e charged organic amide solvent is less than 0.3 kg/mole, the viscosity of the reaction system increases to render the stirring difficult, whereby decomposition reactions tend to occur due to localized heating. It is hence not preferred to charge the organic amide solvent in such a small proportion.

On the other hand, any amount of the charged organic amide solvent greater than 5 kg/mole result in poor producibility of the polymer per volume of the reactor and are hence economically disadvantageous.

Where the alkali metal sulfide is lost by a distilling operation or the like prior to the initiation of a polymerization reaction, the term "the amount of the charged alkali metal sulfide" as used herein means the remaining amount which is obtained by subtracting the loss from the actual charged amount. On the other hand, the term "the amount of the charged dihalogenated aromatic compound" as used herein should be interpreted not to include the amount of the halogen-substituted aromatic compound added in the final stage of the reaction for effecting a stabilizing treatment to be described subsequently.

Polymerization temperature and polymerization time:

Polymerization temperature and polymerization time are important parameters in the process of this invention for the production of the melt-stable PTKs.

In the process of this invention for the production of a melt-stable PTK, the polymerization reaction may desirably be conducted at a temperature within a range of 60° C.–300° C., preferably 150° C.–290° C., more preferably 220° C.–280° C. If the polymerization temperature is lower than 60° C., it takes an unduly long period of time to obtain a polymer. This is certainly disadvantageous from the economical viewpoint. On the other hand, any polymerization temperatures higher than 300° C. are difficult to obtain a melt-stable PTK and moreover, involve a potential danger of decomposition during the polymerization.

The polymerization time required for obtaining a PTK of a desired molecular weight becomes shorter as the polymerization temperature increases but becomes longer as the polymerization temperature decreases.

Accordingly, it is generally advantageous to conduct the polymerization at a temperature of 210° C. or higher from the viewpoint of productivity. It is however not preferred to conduct the reaction at temperatures of 210° C. and higher for 10 hours or longer, because a melt-stable PTK can hardly be obtained when the reaction is continued for 10 hours or longer at a high temperature of 210° C. or higher.

In the present invention, the polymerization reaction is therefore carried out at temperatures within the range of 60° C.–300° C. and the reaction time at 210° C. and higher is controlled within 10 hours.

Reactor:

In the process of this invention for the production of a melt-stable PTK, it is preferable to use, as a reactor (including equipment employed for provisional procedures of a polymerization reaction, for example, distillation), a reactor which is made of a corrosion-resistant material at least at portions with which a reaction mixture is brought into direct contact. The corrosion-resistant material is supposed to be inert so that it does not react with the reaction mixture. Preferable examples of the corrosion resistant material include titanium materials such as titanium and titanium-containing alloys, nickel containing corrosion-resistant materials such as Hastelloy C (a heat-resistant nickel alloy made by Haynes Stellite Company; nickel-molybdenum-chromium alloy containing about 55–60% of nickel, about 15–19% of molybdenum, about 13–16% of chromium, etc.) and austenitic steels (for example, "Carpenter 20", a special austenitic steel containing about 28–38% of nickel, about 19–21% of chromium and about 3–4% of copper and further, molybdenum, etc.). Of these, it is particularly preferred to use a reactor made of a titanium material. The use of a reactor made of a corrosion-resistant material such as that described above makes it possible to obtain a PTK having high melt stability and molecular weight.

Treatment in the final stage of the polymerization

Although a melt-stable PTK can be obtained by the above-described production process, the PTK can be obtained in a form improved further in melt stability by adding a certain kind of halogen-substituted aromatic compound to the reaction system and causing it to undergo a reaction in a final stage of the polymerization.

Here, it should be noted that the term "final stage of the polymerization" as used in the present invention means a period after the lapse of about one third of the overall period of a polymerization reaction from the initiation of the polymerization reaction. Further, the amount of the charged halogen-substituted aromatic compound added in the final stage of the polymerization is not included in the above-described amount of the charged dihalogenated aromatic compound.

As the halogen-substituted aromatic compound useful for the stabilizing treatment in the final stage of the polymerization, it is preferable to use at least one halogen-substituted aromatic compound which contains at least one group having electron-withdrawing property at least equal to —CO— group.

Illustrative examples of such a halogen-substituted aromatic compound may include 4,4'-dichlorobenzophenone and/or 4,4'-dibromobenzophenone employed as a principal monomer component in the polymerization reaction, dichlorobenzophenones other than the 4,4'-isomer, dibromobenzophenones other than the 4,4'-isomer, difluorobenzophenones, dichlorodiphenylsulfones, dibromodiphenylsulfones, monochlorobenzophenones, monobromobenzophenones, monofluorobenzophenones, monochlorodiphenylsulfones, trichlorobenzophenones, tribromobenzophenones, trifluorobenzophenones, tetrachlorobenzophenones, tetrabromobenzophenones, tetrafluorobenzophenones, chloroacetophenones, dichloroacetophenones, chloronitrobenzenes and the like, and mixtures thereof.

Of these, 4,4'-dichlorobenzophenone and/or 4,4'-dibromobenzophenone employed as a monomer has excellent effects for the improvement of the melt stability, permits easy recovery and purification of the thus-used organic amide solvent after the reaction and moreover, is economical. They are hence particularly preferred.

A halogen-substituted aromatic compound, which does not contain any substitutent having electron-withdrawing property either equal to or greater than —CO— group, has poor reactivity and exhibits little effects for the improvement of the melt stability even when it is added in the final stage of the polymerization. For example, monochlorobenzene, dichlorobenzene or an alkyl derivative thereof exhibits little effects for the improvement of the melt stability due to its poor reactivity even when it is added in the final stage of the polymerization.

The halogen-substituted aromatic compound, which is used to effect the treatment in the final stage of the polymerization, may desirably be added in an amount of 0.1–100 moles, preferably 0.5–20 moles, more preferably 1–10 moles per 100 moles of the charged alkali metal sulfide. If it is added in any amounts smaller than 0.1 mole, it shows little effects for the improvement of the melt stability. Even if it is added in any amounts greater than 100 moles on the contrary, its improving effects tend to reach saturation. It is hence not economical to use it in such a large amount.

It is desirable to conduct the final-stage treatment by adding the above-mentioned halogen-substituted aromatic compound to the polymerization reaction system in the final stage of the polymerization and then allowing it to react at 60° C.–300° C., more preferably 150° C.–290° C., most preferably 220° C.–280° C. for 0.1–20 hours, more preferably 0.3–8 hours. There is a potential problem that the reaction may not proceed sufficiently when the reaction temperature is lower than 60° C. or when the reaction time is shorter than 0.1 hour. On the other hand, there is another potential problem that the melt stability of a PTK is reduced conversely when the reaction temperature is higher than 300° C. or when the reaction time is longer than 20 hours. Such reaction temperatures and times are hence not preferred.

Recovery of PTKs:

The recovery of a PTK from a reaction mixture may be practised in the following manner by way of example. Subsequent to the completion of the polymerization (including the treatment in the final stage of the polymerization), the reaction mixture is cooled. The reaction mixture is optionally diluted with a diluent having miscibility with the organic amide solvent. The reaction mixture is then allowed to stand or is centrifuged, whereby solids are precipitated out. The solids are separated by filtration or sifting. If significant amount of inorganic salts is contained in the solids, the solids are washed with water to remove the inorganic salts. The solids are optionally treated with an acidic solution (a solution of a strong acid or a solution of a salt formed from a strong acid and a weak base). They are washed at least once with an organic solvent and/or water and are then dried.

Molded and Formed Products

Since the PTKs of this invention are melt-stable crystalline polymers permitting easy application of conventional melt processing techniques, they can be processed by extrusion, injection molding, melt spinning, etc. Their formed products may be subjected to stretching or orientation. By these processing techniques, heat-resistant molded and formed products such as extrusion products, injection-molded products, fibers and films can be obtained.

These molded and formed products may be obtained not only from the PTK polymers alone but also their compositions with one or more polymers of different kinds, one or more fibrous fillers, one or more inorganic filler and/or the like.

As exemplary polymers of different kinds which may be mixed with the melt-stable PTKs of the present invention, may be mentioned resins such as poly(arylene thioethers), PEEKs, PEKs, polyimides, polyamides (including Aramids), polyamideimides, polyesters (including aromatic polyesters and liquid crystalline polyesters), polysulfones, polyether sulfones, polyether imides, polyarylenes, poly(phenylene ethers), polycarbonates, polyester carbonates, polyacetals, fluoropolymers, polyolefins, polystyrenes, PMMA and ABS; as well as elastomers such as fluororubbers, silicone rubbers, olefin rubbers, acrylic rubbers, polyisobutylenes (including butyl rubber), hydrogenated SBR, polyamide elastomers and polyester elastomers.

These polymers may be used either singly or in combination.

Illustrative examples of the fibrous filler, which may be added to the melt-stable PTKs of this invention, may include fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers.

As exemplary inorganic fillers which may be incorporated in the melt-stable PTKs of this invention, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all, in a powder form.

These fibrous fillers and inorganic fillers may be used either singly or in combination.

Among these fillers, glass fibers and/or carbon fibers are particularly preferred from the viewpoints of physical properties and economy.

The PTKs of the present invention and their compositions may also be added with small amounts of additives such as stabilizers, corrosion preventives, surface-roughening agents, nucleating agents, mold-releasing agents, colorants, coupling agents, flash preventives and/or antistatic agents.

Application Fields of the PTKs of This Invention

Since the melt-stable PTKs of the present invention permits the application of conventional melt processing techniques, they can be molded or formed into various heat-resistant products by these techniques and can then be used in various fields.

Namely, injection-molded products may be used, for example, as various electronic and electric parts (circuit boards, sealants for electronic parts, connectors, etc.), car parts (various parts installed around engines), precision parts (parts for cameras, watches, clocks, etc.), plastic magnets, sliding members, etc.

Extrusion products may include, for example, sheets and plates (stampable sheets, trays, etc.), pipes and tubes (pipings for the chemical industry, warm/hot water pipings, pipes for electric wires and cables, etc.), heat-resistant covered conductors, blow bottles, rods, profiles, etc.

Fibers may be used, for example, as industrial filters, heat-insulating materials, reinforcing fibers, insulating tapes, insulating cloths, fireproof wears, high-temperature gloves, prepreg fibers, tension members for fiber optic cables, etc.

Films may be used, for example, as base films for magnetic recording materials (especially, including films for vacuum deposition or sputtering and films for magnetic recording films of the perpendicular magnetization type), films for capacitors (films for chip-type capacitors, in particular), printed circuit boards (including both flexible and rigid types), insulating films, printer tapes, stampable sheets, various trays, containers, etc.

In addition, applications such as heat- and corrosion-resistant coating materials, sizing agents for reinforcing fillers and various polymer-modifying blending resins may also be mentioned by way of example. It should however be borne in mind that the application of the present invention is not limited to the fields mentioned above by way of example.

ADVANTAGES OF THE INVENTION

The melt-stable PTKs of this invention are high molecular-weight and high crystallinity polymers having a high degree of melt stability sufficient for the application of conventional melt processing techniques.

In accordance with the production process of this invention, the melt-stable PTKs can be economically and easily provided by using relatively inexpensive raw materials.

Various molded and formed products having heat resistance, such as heat-resistant extrusion products, injection-molded products, fibers and films, can be produced inexpensively from the melt-stable PTKs of the present invention.

In view of the fact that PTKS having low melt stability, low density and poor processability have only been known conventionally, it is an unexpectable and significant advantage that PTKs having melt stability and high density and melt-molded or formed products having high strength can be obtained in accordance with the present invention.

EMBODIMENTS OF THE INVENTION

The present invention will hereinafter be described in further detail by the following Examples and Comparative Examples. It should however be borne in mind that the scope of the present invention is not limited to the following Examples.

EXAMPLES 1-3 & Comparative Examples 1-7

[EXAMPLE 1]

A titanium-lined reactor was charged with 9.0 moles of 4,4'-dichlorobenzophenone (hereinafter abbreviated as "DCBP"; product of Ihara Chemical Industry Co., Ltd.), 9.0 moles of hydrated sodium sulfide (water content: 53.6 wt. %; product of Sankyo Kasei Co., Ltd.) and 9.0 kg of N-methylpyrrolidone (hereinafter abbreviated as "NMP") (water content/NMP=5.0 moles/kg). After the reactor being purged with nitrogen gas, the resultant mixture was maintained at 240° C. for 2.5 hours to react them. In order to apply the treatment in the final stage of the polymerization, a mixture composed of 0.9 mole of DCBP, 1.5 kg of NMP and 7.5 moles of water was added under pressure at the same temperature over 1 hour, and the resultant mixture was maintained further at 260° C. for 0.3 hour to react them.

The reactor was cooled, and the reaction mixture in the form of a slurry was taken out of the reactor and was then poured into about 20 l of acetone. The resultant polymer was precipitated. The polymer was collected by filtration, and then washed twice with acetone and additionally twice with water. Acetone and water were removed to obtain the polymer in a wet form. The wet polymer was dried at 80° C. for 12 hours under reduced pressure, thereby obtaining Polymer 1 as an ivory powder.

[EXAMPLE 2]

A titanium-lined reactor was charged with 9.09 moles of DCBP, 9.0 moles of hydrated sodium sulfide (water content: 53.6 wt. %) and 9.0 kg of NMP (water content/NMP=5.0 moles/kg). After the reactor being purged with nitrogen gas, the resultant mixture was maintained at 241° C. for 2.5 hours to react them. The reaction mixture in the form of a slurry was treated in the same manner as in Example 1 to obtain Polymer 2 as an ivory powder.

[EXAMPLE 3]

A titanium-lined reactor was charged with 9.09 moles of DCBP, 9.0 moles of hydrated sodium sulfide (water content: 53.6 wt. %) and 9.0 kg of NMP (water content/NMP=5.0 moles/kg). After the reactor being purged with nitrogen gas, the resultant mixture was maintained at 241° C. for 50 minutes to react them. The reaction mixture in the form of a slurry was treated in the same manner as in Example 1 to obtain Polymer 3 as an ivory powder.

[Comparative Example 1]

A reactor made of SUS 316 (Stainless Steel Type 316 as prescribed in the ASTM; the same definition will apply hereinafter) was charged with 9.09 moles of DCBP, 9.0 moles of anhydrous lithium acetate, 9.0 moles of hydrated sodium sulfide (water content: 53.6 wt. %) and 9.0 kg of NMP (water content/NMP=5.0 moles/kg). After the reactor being purged with nitrogen gas, the resultant mixture was maintained at 241° C. for 12 hours to react them. The reaction mixture in the form of a slurry was treated in the same manner as in Example 1 to obtain Polymer 1R as a dark yellow powder.

[Comparative Example 2]

A reactor made of SUS 316 was charged with 10 moles of sodium sulfide nonahydrate, 5.0 l of NMP and 10 moles of lithium acetate. The resultant mixture was heated up to 200° C. under a nitrogen gas stream to remove water therefrom, whereby 1580 g of distilled aqueous solution containing 104 g of NMP was obtained. After the reactor was cooled to 120° C., a solution formed of 10 moles of DCBP and 0.8 l of NMP was charged (water content/NMP=1.4 moles/kg). The thus-obtained mixture was maintained, under stirring and nitrogen gas pressure, at 230° C. for 2 hours and then at 250° C. for 1 hour so as to react them. After the polymerization reaction, the reaction mixture in the form of a slurry was poured into water. A polymer thus precipitated was washed with water and acetone separately and repeatedly, and was then dried to obtain Polymer 2R as a brown powder.

A portion of Polymer 2R was heated at 250° C. for two hours in air, thereby obtaining Polymer 2CR in the form of cured black powder.

[Comparative Example 3]

A reactor made of SUS 316 was charged with 1.0 mole of sodium sulfide trihydrate, 800 ml of NMP and 1.0 g of sodium hydroxide. The resulting mixture was heated up to 210° C., whereby 42 g of aqueous solution containing 3 g of NMP was distilled out. The residue was then cooled to about 45° C. Under vigorous stirring, 1.0 mole of 4,4'-difluorobenzophenone and 0.033 mole of sodium sulfite were added (water content/NMP=0.9 mole/kg). The reaction system was pressurized to 5 atm with nitrogen gas, and the contents were maintained at 250° C. for 4 hours to polymerize them. After the reaction, the reactor was cooled to 100° C., and the reaction mixture in the form of a slurry was taken out. The resulting polymer was separated and then washed with hot water and acetone separately and repeatedly. After washed sufficiently, it was dried fully to obtain Polymer 3R as a yellowish brown powder.

[Comparative Example 4]

In exactly the same manner as in Comparative Example 3 except that DCBP was used instead of 4,4'-difluorobenzophenone, Polymer 4R was obtained as a yellowish brown powder.

[Comparative Example 5]

In a flask, 0.804 mole of 4-(4-chlorobenzoyl)-thiophenol, 45.1 g (114.5 g/mole solution) of an aqueous solution of potassium hydroxide, 300 g of 1,1-dioxothiolan and 300 g of diphenylsulfone were heated for 3 hours under reduced pressure (15 Torr) to remove any water that had been formed and 1,1-dioxothiolan at a temperature initially 20° C. rising to 60° C.. The reaction mixture turned to a solid (the water content was practically 0). The mixture was cooled and then heated at 350° C. for 3 hours in a nitrogen gas atmosphere. The mixture turned to a liquid at about 340° C. The mixture was cooled and solidified. It was taken out of the flask, ground and extracted four times with 4 l of hot methanol, twice with 4 l of hot water and once again with 4 l of hot methanol, and then dried to obtain Polymer 5R as a yellow powder.

Comparative Example 6]

Ten moles of 4,4'-dichlorobenzophenone were dissolved in 30 kg of DMF. Ten moles of sodium sulfide nonahydrate were charged in a reactor made of SUS 316, followed by an addition of the above-prepared solution (water content/DMF=3 moles/kg). After the reactor was purged with nitrogen gas, they were reacted at about 175° C. for 27 hours. The thus-obtained reaction mixture was washed 5 times with hot water and 5 times with DMF, thereby obtaining Polymer 6R as a yellow powder.

[Comparative Example 7]

A reactor made of "Hastelloy C" (nickel-molybdenum-chromium alloy) was charged with 7.82 g (0.042 mole) of diphenyl sulfide, 22.4 g (0.226 mole) of phosgene and 11.2 g (0.168 mole) of anhydrous aluminum trichloride. They were reacted at an internal temperature of 20° C. for 3.5 hours under stirring. Subsequently, the reactor was heated to an internal temperature of 40° C. to react them for additional 3 hours. After the internal temperature was raised to 110° C. over 30 minutes, the reaction was continued for 4 hours. After the reaction mixture was allowed to cool to room temperature, the remaining pressure was released and unreacted phosgene was replaced by nitrogen gas.

The contents were taken out of the reactor and the aluminum trichloride was decomposed with 300 ml of methanol. The resultant polymer was washed twice with boiling water (200 ml each) and dried overnight at 120° C. in a vacuum, thereby obtaining Polymer 7R as a yellow powder.

Incidentally, Polymers 2R, 2CR (cured form), 3R, 4R, 5R, 6R and 7R were prepared by following the processes disclosed in Publications A, A, B, B, D, E and F respectively. They were provided as exemplary PTKs according to the prior art.

Measurement of melting points:

With respect to each of the PTKs thus obtained, the melting point, Tm was measured as an index of its heat resistance. The measurement was performed in the following manner. About 10 mg of each PTK (powder) was weighed. The sample was held at 50° C. for 5 minutes in an inert gas atmosphere and then heated up at a rate of 10° C./min so as to measure its melting point on a DSC (Model TC10A; manufactured by Mettler Company). Results are collectively shown in Table 1. Measurement of residual melt crystallization enthalpies:

With respect to each of the PTKs polymerized above, the residual melt crystallization enthalpy, ΔHmc (420° C./10 min) was measured as an index of its melt stability. Namely, the temperature corresponding to a peak of melt crystallization measured by the DSC is represented by Tmc (420° C./10 min) and the amount of heat converted from the area underneath of the peak was taken as residual melt crystallization enthalpy, ΔHmc (420° C./10 min). Described specifically, about 10 mg of each PTK (powder form) was weighed. After holding the PTK at 50° C. for 5 minutes in an inert gas atmosphere, it was heated at a rate of 75° C./min up to 420° C. and held at that temperature for 10 minutes. While cooling the PTK at a rate of 10° C./min, its Hmc (420° C./10 min) and Tmc (420° C./10 min) were measured. Results are collectively shown in Table 1.

Melt processing test:

With respect to each of the PTKs polymerized above, melt extrusion was conducted to investigate its melt processability, in other words, to test the long run characteristics of its melt processing. Namely, each PTK (powder) was charged under a nitrogen gas stream into a single-screw extruder which had a cylinder diameter of 40 mm and a cylinder length of 1 m and was equipped with a nozzle having a diameter of 5 mm. The PTK was molten and extruded at a cylinder temperature of 375° C. and an residence time in the cylinder of about 3 minutes. For each PTK, the time was measured from the initiation of its extrusion until its extrusion became difficult due to the increase of extrusion torque. Results are also given collectively in Table 1.

Evaluation of melt processability:

Those having at least 2 hours long-run time of melt processing were evaluated as having "good" melt processability, those having 0.5-2 hours long-run time were evaluated as having "fair" melt processability, and those having less than 0.5 hour long-run time were evaluated as having "poor" melt processability. Results are also shown collectively in Table 1.

It was found from Table 1 that those having Hmc (420° C./10 min) of at least 10 J/g out of the PTK samples all had good melt processability while those having ΔHmc (420° C./10 min) smaller than 10 J/g all had poor melt processability. It has therefore been found that ΔHmc (420° C./10 min) can be used as an effective index of melt processability. In addition, Polymers 2R–7R which were conventional PTKs all had Hmc (420° C./10 min) smaller than 10 J/g and their melt processability was extremely poor.

TABLE 1

|  | Example | | |
|---|---|---|---|
|  | 1 | 2 | 3 |
| Heat resistance Tm (°C.) | 367 | 366 | 363 |
| Melt stability |  |  |  |
| ΔHmc (420° C./10 min) (J/g) | 55 | 41 | 47 |
| Tmc (420° C./10 min) (°C.) | 305 | 290 | 300 |
| Melt processing long-run time (hr) | >2 | >2 | >2 |
| Evaluation of melt processability | Good | Good | Good |
| Remarks: |  |  |  |
| Polymer No. | 1 | 2 | 3 |

|  | Comparative Example | | | |
|---|---|---|---|---|
|  | 1 | 2 | 2 | 3 |
| Heat resistance Tm (°C.) | 363 | 335 | 331 | 365 |
| Melt stability |  |  |  |  |
| ΔHmc (420° C./10 min) (J/g) | 0 | 0 | 0 | 0 |
| Tmc (420° C./10 min) (°C.) | ND$^2$ | ND$^2$ | ND$^2$ | ND$^2$ |
| Melt processing long-run time (hr) | <0.5 | <0.5 | <0.5 | <0.5 |
| Evaluation of melt processability | Poor | Poor | Poor | Poor |
| Remarks: |  |  |  |  |
| Polymer No. | 1R | 2R | 2CR | 3R |

TABLE 1-continued

|  | Excessively long polymerization time. Polymerization aid used. | Conventional PTK | Conventional cured PTK | Conventional PTK |
|---|---|---|---|---|

| | Comparative Example | | | |
|---|---|---|---|---|
| | 4 | 5 | 6 | 7 |
| Heat resistance Tm (°C.) | 363 | 355 | 330–360[1] | ND[2] |
| Melt stability | | | | |
| ΔHmc (420° C./10 min) (J/g) | 0 | 0 | 0 | 0 |
| Tmc (420° C./10 min) (°C.) | ND[2] | ND[2] | ND[2] | ND[2] |
| Melt processing long-run time (hr) | <0.5 | <0.5 | <0.5 | — |
| Evaluation of melt processability | Poor | Poor | Poor | — |
| Remarks: | | | | |
| Polymer No. | 4R | 5R | 6R | 7R[3] |
| | Conventional PTK | Conventional PTK | Conventional PTK. | Conventional PTK |

[1]Instable plural melting point peaks were observed (probably due to decomposition).
[2]ND: Not detected.
[3]Amorphous polymer. Tm was not detectable (the investigation of melt processability was omitted for poor heat resistance).

Measurements of densities and solution viscosities:

With respect to Polymers 1, 2 and 3 having good melt processability and Polymer 2CR which was a conventional cured PTK, their densities were measured as indices of their crystallinity. Namely, each PTK (powder) was first of all placed between two polyimide films ("Kapton", trade mark; product of E. I. du Pont de Nemours & Co., Inc. Using a hot press, it was preheated at 385° C. for 2 minutes and then press-formed at 385° C. for 0.5 minute. It was then quenched to obtain an amorphous sheet whose thickness was about 0.15 mm. A part of the amorphous sheet was used directly as a sample, while the remaining part was annealed at 280° C. for 30 minutes to use it as an annealed sample with an increased degree of crystallization. Their densities were measured separately at 25° C. by means of a density gradient tube (lithium bromide/water). Results are given collectively in Table 2.

It was found from Table 2 that the density of Polymer 2CR, a conventional cured PTK, did not increase to any substantial extent even when annealed and its crystallinity was hence extremely low. As to PTK Polymers 1, 2 and 3 having good melt processability their solution viscosities (reduced viscosities, $\eta_{red}$) were measured respectively as indices of their molecular weights. Namely, each PTK sample was dissolved in 98 wt. % sulfuric acid to give a polymer concentration of 0.5 g/dl. The reduced viscosity of the resultant solution was then measured at 25° C. by means of a Ubbellohde viscometer. It was however impossible to measure the reduced viscosity of Polymer 2CR which was a cured PTK, since it was substantially insoluble in 98 wt. % sulfuric acid. Results are also shown collectively in Table 2.

TABLE 2

| | Example | | | Comp. Ex. |
|---|---|---|---|---|
| | 1 | 2 | 3 | 2 |
| Density (25° C.) | | | | |
| Amorphous sheet (g/cm³) | 1.30 | 1.30 | 1.30 | 1.27* |
| Annealed sheet (g/cm³) | 1.35 | 1.35 | 1.35 | 1.30* |
| Evaluation of crystallinity | High | High | High | Extremely low |
| Molecular weight, $\eta_{red}$ (dl/g) | 0.82 | 0.60 | 0.25 | —** |
| Remarks: Polymer No. | 1 | 2 | 3 | 2CR |

TABLE 2-continued

| | Example | | | Comp. Ex. |
|---|---|---|---|---|
| | 1 | 2 | 3 | 2 |
| | | | | Conventional cured PTK |

*Thermal decomposition was observed in the course of the preparation of the amorphous sheet.
**Substantially insoluble in 98 wt. % sulfuric acid.

EXAMPLE 4 & Comparative Examples 8–16

[EXAMPLE 4]

A titanium-lined reactor was charged with 1.0 mole of hydrated sodium sulfide (water content: 53.6 wt. %), 1.0 kg of NMP and 1.01 moles of DCBP (water content/NMP=5.0 moles/kg). They were thereafter reacted at 240° C. for 2 hours. After completion of the reaction, the reaction mixture in the form of a slurry was treated in the same manner as in Example 1 so that Polymer 4 was recovered as an ivory powder.

[Comparative Example 8]

A titanium-lined reactor was charged with 1.0 mole of hydrated sodium sulfide (water content: 53.6 wt. %) and 1.0 kg of NMP. The resultant mixture was heated to about 202° C. under a nitrogen gas stream to distill 3.5 moles of water. At that time, 0.029 mole of hydrogen sulfide was also distilled (water content: 1.5 moles; remaining sodium sulfide: 0.971 mole).

DCBP was then charged to contain 1.01 moles of DCBP per mole of the remaining sodium sulfide. They were thereafter reacted at 240° C. for 2 hours. After the reaction, the reaction mixture in the form of a slurry, which was colored hard and gave off offensive odor, was treated in the same manner as in Example 1 to recover Polymer 8R as a brown powder.

[Comparative Example 9]

Polymer 9R was obtained as a yellowish brown powder by conducting polymerization in the same manner as in Example 4 except that 11 moles of water was added instead of the dehydration treatment.

With respect to Polymers 8R and 9R obtained above, their ΔHmc (420° C./10 min), Tmc (420° C./10 min), and $\eta_{red}$ were measured.

Results are shown collectively in Table 3.

TABLE 3

| | Water content/ amount of the charged NMP (moles/kg) | Physical properties of polymer | | | Remarks Polymer No. |
|---|---|---|---|---|---|
| | | ΔHmc (420° C./10 min) (J/g) | Tmc (420° C./10 min) (°C.) | $\eta_{red}$ (dl/g) | |
| Ex. 4 | 5.0 | 45 | 290 | 0.50 | 4 |
| Comp. Ex. 8 | 1.5 | approx. 0 | N.D. | <0.15 | 8R Decomposed |
| Comp. Ex. 9 | 16.0 | 30 | 260 | <0.15 | 9R, Low polymerization degree |

[Comparative Example 10]

Polymerization was conducted in the same manner as in Example 4 except that the amount of the charged DCBP was changed to 0.93 mole. After the polymerization, the reaction mixture in the form of a slurry was tinged in a brown color and gave off offensive odor. The slurry as the reaction mixture was treated in the same manner as in Example 1 to recover Polymer 10R as a dark yellow powder.

[Comparative Example 11]

Polymerization was conducted in the same manner as in Example 4 except that the amount of the charged DCBP was changed to 1.30 moles. After the reaction, the reaction mixture in the form of a slurry was treated in the same manner as in Example 1 to recover Polymer 11R as an ivory powder.

ΔHmc (420° C./10 min), Tmc (420° C./10 min) and $\eta_{red}$ of Polymers 10R and 11R obtained above were measured.

Results are shown in Table 4.

50° C. for 120 hours instead of at 240° C. for 2 hours. Almost no polymeric substance was recovered from the reaction mixture in the form of a slurry.

[Comparative Example 14]

Polymerization was conducted in the same manner as in Example 4 except that 1.0 mole of hydrated sodium sulfide, 1.0 kg of NMP and 1.0 mole of anhydrous lithium acetate were charged in place of 1.0 mole of hydrated sodium sulfide and 1.0 kg of NMP. After the polymerization, the reaction mixture in the form of a slurry was treated in the same manner as in Example 1, thereby recovering Polymer 14R as an ivory powder.

[Comparative Example 15]

Polymerization was conducted in the same manner as in Comparative Example 14 except that 1.0 mole of anhydrous sodium benzoate was used instead of 1.0 mole of anhydrous lithium acetate. After the polymerization, the reaction mixture in the form of a slurry was treated in the same manner as in Example 1, thereby recovering Polymer 15R as an ivory powder.

[Comparative Example 16]

Polymerization was conducted in the same manner as in Comparative Example 14 except that 1.0 mole of

TABLE 4

| | Amount of charged DCBP/amount of charged sodium sulfide (mole/mole) | Physical properties of polymer | | | Remarks Polymer No. |
|---|---|---|---|---|---|
| | | ΔHmc (420° C./10 min) (J/g) | Tmc (420° C./10 min) (°C.) | $\eta_{red}$ (dl/g) | |
| Ex. 4 | 1.01 | 45 | 290 | 0.50 | 4 |
| Comp. Ex. 10 | 0.93 | approx. 0 | N.D. | <0.15 | 10R Decomposed |
| Comp. Ex. 11 | 1.30 | 40 | 285 | <0.15 | 11R |

[Comparative Example 12]

Polymerization was conducted in the same manner as in Example 4 except that the reactants were reacted at 310° C. for 1 hour instead of at 240° C. for 2 hours. After the polymerization, the reaction mixture in the form of a slurry was tinged in a black color and gave off offensive odor. No polymer was recovered.

[Comparative Example 13]

Polymerization was conducted in the same manner as in Example 4 except that the reactants were reacted at anhydrous sodium carbonate was used instead of 1.0 mole of anhydrous lithium acetate. After the polymerization, the reaction mixture in the form of a slurry was treated in the same manner as in Example 1, thereby recovering Polymer 16R as an ivory powder.

ΔHmc (420° C./10 min), Tmc (420° C./10 min) and $\eta_{red}$ of Polymers 14R, 15R and 16R obtained above were measured.

Results are shown collectively in Table 5.

TABLE 5

| | Polymerization aid added | Physical properties of polymer | | | Remarks Polymer No. |
|---|---|---|---|---|---|
| | | ΔHmc (420° C./10 min) (J/g) | Tmc (420° C./10 min) (°C.) | $\eta_{red}$ (dl/g) | |
| Ex. 4 | Not added | 45 | 290 | 0.50 | 4 |
| Comp. | Lithium acetate | approx. 0 | N.D. | 0.61 | 14R |

TABLE 5-continued

| | Polymerization aid added | Physical properties of polymer | | | Remarks |
|---|---|---|---|---|---|
| | | ΔHmc (420° C./10 min) (J/g) | Tmc (420° C./10 min) (°C.) | $\eta_{red}$ (dl/g) | Polymer No. |
| Ex. 14 Comp. Ex. 15 | Sodium benzoate | approx. 0 | N.D. | 0.60 | 15R |
| Comp. Ex. 16 | Sodium carbonate | approx. 0 | N.D. | 0.52 | 16R |

EXAMPLES 5–11

[EXAMPLE 5]

Polymerization was conducted in the same manner as in Example 1 except that as the treatment in the final stage of the polymerization, 1.8 moles of 4-chlorobenzophenone, 1.5 kg of NMP and 7.5 moles of water were charged instead of charging 0.9 mole of DCBP, 1.5 kg of NMP and 7.5 moles of water. The reaction mixture thus obtained in the form of a slurry was treated in the same manner to recover Polymer 5 as an ivory powder.

[EXAMPLE 6]

Polymerization was conducted in the same manner as in Example 1 except that as the treatment in the final stage of the polymerization, 0.9 mole of p-dichlorobenzene, 1.5 kg of NMP and 7.5 moles of water were charged instead of charging 0.9 mole of DCBP, 1.5 kg of NMP and 7.5 moles of water. The reaction mixture thus obtained in the form of a slurry was treated in the same manner to recover Polymer 6 as a yellow powder.

[EXAMPLE 7]

Polymerization was conducted in the same manner as in Example 1 except that as the treatment in the final stage of the polymerization, 1.5 kg of NMP and 7.5 moles of water were charged instead of charging 0.9 mole of DCBP, 1.5 kg of NMP and 7.5 moles of water. The reaction mixture thus obtained in the form of a slurry was treated in the same manner to recover Polymer 7 as a yellow powder.

ΔHmc (420° C./10 min), Tmc (420° C./10 min) and $\theta_{red}$ of Polymers 5–7 obtained above were measured.

Results are shown collectively in Table 6.

[EXAMPLE 8]

Polymerization was conducted in the same manner as in Example 4 except that 0.95 mole of DCBP, 0.04 mole of 4,4'-dibromobenzophenone and 0.02 mole of 4,4'-dibromobiphenyl were charged instead of charging 1.01 moles of DCBP. The reaction mixture in the form of a slurry was treated in the same manner as in Example 4 to recover Polymer 8 as a yellow powder.

ΔHmc (420° C./10 min), Tmc (420° C./10 min) and $\theta_{red}$ of Polymer 8 were 33 J/g, 288° C. and 0.33 d/g respectively.

[EXAMPLE 9]

Polymerization was conducted in the same manner as in Example 4 except for the use of an autoclave made of "Hastelloy C" instead of the titanium-lined autoclave. The reaction mixture in the form of a slurry was treated in the same manner as in Example 1 to recover Polymer 9 as a pale brown powder.

[EXAMPLE 10]

A reaction was conducted in the same manner as in Example 4 except that an autoclave made of SUS 316 was used instead of the titanium-lined autoclave. For the treatment in the final stage of the polymerization, a mixture composed of 0.1 mole of DCBP, 0.17 kg of NMP and 0.85 mole of water was added under pressure at 240° C. over 30 minutes and the resultant mixture was maintained at 260° C. for 30 minutes to react them. After completion of the reaction, the reaction mixture in the form of a slurry was treated in the same manner as in Example 1 to recover Polymer 10 as a yellow powder.

[EXAMPLE 11]

A reaction was conducted in the same manner as in Example 4 except that a nickel-lined autoclave was used instead of the titanium-lined autoclave. For the treatment in the final stage of the polymerization, a mixture composed of 0.1 mole of DCBP, 0.17 kg of NMP and 0.85 mole of water was added under pressure at 240° C. over 30 minutes and the resultant mixture was maintained at 260° C. for 30 minutes to react them. After completion of the reaction, the reaction mixture in the form of a slurry was treated in the same manner as in Example 1 to recover Polymer 11 as a yellow powder.

With respect to Polymers 9, 10 and 11 obtained above, their ΔHmc (420° C./10 min), Tmc (420° C./10 min) and $\eta_{red}$ were measured.

Results are shown collectively in Table 7.

TABLE 6

| | Additive incorporated in the final stage of polymerization | Physical properties of polymer | | | Remarks |
|---|---|---|---|---|---|
| | | ΔHmc (420° C./10 min) (J/g) | Tmc (420° C./10 min) (°C.) | $\eta_{red}$ (dl/g) | Polymer No. |
| Ex. 1 | DCBP | 55 | 305 | 0.82 | 1 |
| Ex. 5 | 4-Chlorobenzophenone | 53 | 300 | 0.58 | 5 |
| Ex. 6 | p-Dichlorobenzene | 10 | 283 | 0.55 | 6 |
| Ex. 7 | Not added | 11 | 292 | 0.62 | 7 |

TABLE 7

| | Material of autoclave | Physical properties of polymer | | | Remarks Polymer No. |
|---|---|---|---|---|---|
| | | ΔHmc (420° C./10 min) (J/g) | Tmc (420° C./10 min) (°C.) | $\eta_{red}$ (dl/g) | |
| Ex. 4 | Titanium | 45 | 290 | 0.50 | 4 |
| Ex. 9 | Hastelloy C | 16 | 230 | 0.39 | 9 |
| Ex. 10 | SUS 316 | 16 | 240 | 0.34 | 10* |
| Ex. 11 | Nickel | 15 | 230 | 0.37 | 11* |

*Treatment in the final stage of polymerization was applied.

EXAMPLES 12-15

[EXAMPLE 12]

A titanium-lined polymerization reactor was charged with 0.5 mole of DCBP, 0.497 mole of hydrated sodium sulfide (water content: 53.6 wt. %) and 500 g of NMP (water content/NMP=5.0 moles/kg). After the reactor was purged with nitrogen gas, the resultant mixture was maintained at 240° C. for 2 hours. For the treatment in the final stage of the polymerization, a mixture composed of 0.05 mole of DCBP, 300 g of NMP and 1.5 moles of water was charged under pressure at the same temperature over 30 minutes, followed by a further reaction at 240° C. for 1 hour. After the reaction, the reaction mixture in the form of a slurry was treated in the same manner as in Example 1 to recover Polymer 12 as an ivory powder.

[EXAMPLE 13]

Following the procedure of Example 12 except that 0.5 mole of DCBP and 0.005 mole of 2,2',4,4'-tetrachlorobenzophenone were charged instead of charging 0.50 mole of DCBP, polymerization and treatment of a slurry as a reaction mixture were conducted to recover Polymer 13 as an ivory powder.

[EXAMPLE 14]

Following the procedure of Example 12 except that 0.5 mole of DCBP and 0.01 mole of 2,2',4,4' -tetrachlorobenzophenone were charged instead of charging 0.50 mole of DCBP, polymerization and treatment of a slurry as a reaction mixture were conducted to recover Polymer 14 as an ivory powder.

[EXAMPLE 15]

Following the procedure of Example 12 except that 0.5 mole of DCBP and 0.025 mole of 2,2',4,4'-tetrachlorobenzophenone were charged instead of 0.50 mole of DCBP, polymerization and treatment of a slurry as a reaction mixture were conducted to recover Polymer 15 as an ivory powder.

With respect to Polymers 12-15 obtained above, their ΔHmc (420° C./10 min), Tmc (420° C./10 min) and melting points Tm, their densities in a form crystallized by annealing them separately at 280° C. for 30 minutes, as well as their reduced viscosities were measured. Results are given collectively in Table 8.

From the results shown in Table 8, it is understood that PTKs obtained by polymerizing while using a small amount of a crosslinking agent (tetrachlorobenzophenone) have a high molecular weight and melt stability.

TABLE 8

| | Example | | | |
|---|---|---|---|---|
| | 12 | 13 | 14 | 15 |
| Heat resistance | | | | |
| Tm (°C.) | 360 | 354 | 349 | 342 |
| Melt stability | | | | |
| ΔHmc (420° C./10 min) (J/g) | 44 | 40 | 45 | 40 |
| Tmc (420° C./10 min) (°C.) | 294 | 293 | 291 | 289 |
| Density (25° C.) | | | | |
| Amorphous sheet (g/cm³) | 1.30 | 1.30 | 1.30 | 1.30 |
| Annealed sheet (g/cm³) | 1.35 | 1.35 | 1.35 | 1.34 |
| Molecular weight | | | | |
| $\eta_{red}$ (dl/g) | 0.68 | 0.82 | 0.98 | 0.70 |
| Remarks: | | | | |
| Polymer No. | 12 | 13 | 14 | 15 |
| DCBP/tetrachlorobenzophenone (by molar ratio) | 100/0 | 99/1 | 98/2 | 95/5 |

We claim:

1. A melt-stable poly(arylene thioether-ketone) having predominant recurring units of the formula

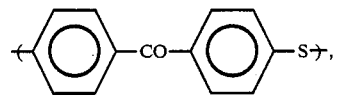

wherein the —CO— and —S— are in the para position to each other, and having the following physical properties (a)-(c):
 (a) melting point, Tm being 310°-380° C.;
 (b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter at a cooling rate of 10° C./min, after the poly(arylene thioether-ketone) is held at 50° C. for 5 minutes in an inert gas atmosphere, heated to 420° C. at a rate of 75° C./min and then held for 10 minutes at 420° C.; and
 (c) reduced viscosity being 0.2-2 dl/g as determined by viscosity measurement at 25° C. and a polymer concentration of 0.5 g/d in 98 percent by weight sulfuric acid.

2. The melt-stable poly(arylene thioetherketone) as claimed in claim 1, wherein the poly(arylene thioether-ketone) has a density of at least 1.34 g/cm³ at 25° C. when annealed at 280° C. for 30 minutes.

3. The melt-stable poly(arylene thioetherketone) as claimed in claim 1, wherein the poly(arylene thioether-ketone) is an uncured polymer.

4. The melt-stable poly(arylene thioetherketone) as claimed in claim 1, wherein the poly(arylene thioether-ketone) is a polymer having a partially crosslinked and/or branched structure.

* * * * *

Disclaimer 4,895,925.—*Yoshikatsu Satake; Takashi Kaneko; Yutaka Kobayashi; Yo Iizuka; Takayuki Katto; Zenya Shiiki*, all of Iwaki, Japan. MELT-STABLE POLY(ARYLENE THIOETHER-KETONE) AND PRODUCTION PROCESS THEREOF. Patent dated Jan. 23, 1990. Disclaimer filed Feb. 14, 1990, by the assignee, Kureha Kagaku Kogyo K. K.

The term of this patent subsequent to October 10, 2006, has been disclaimed.
[ *Official Gazette April 24, 1990* ]